Dec. 21, 1926. 1,611,397
P. D. WELLS
HANGER FOR SEED CORN
Filed July 14, 1926
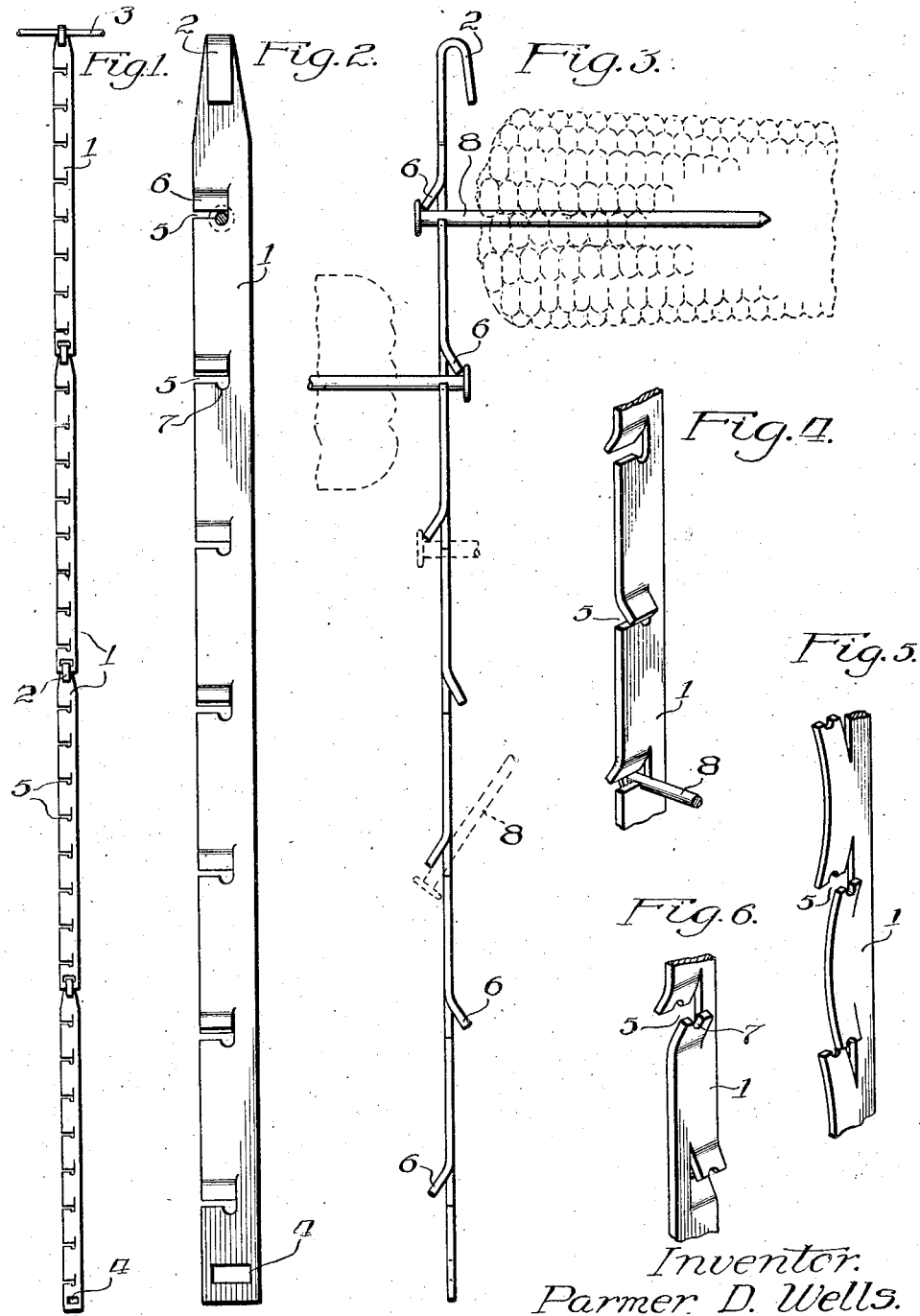

Patented Dec. 21, 1926.

1,611,397

UNITED STATES PATENT OFFICE.

PARMER D. WELLS, OF GARY, INDIANA.

HANGER FOR SEED CORN.

Application filed July 14, 1926. Serial No. 122,390.

This invention relates to hangers or racks for seed corn and the like, and is chiefly characterized by providing a sheet metal strip which is adapted to be hung in a vertical position, and which is provided with lugs bent outwardly to provide notches for receiving the heads of nails which have been forced into the end of the ears of corn, the lugs providing an offset engaging surface for holding the ears at right angles to the strip.

In preparing seed corn it is necessary to thoroughly dry the corn on the cob, and heretofore the usual custom has been to tie the husks of the ears together and throw the bundles thus formed over a rafter in a barn or some such place, and leave the seed corn hanging until spring. In such haphazard methods the ears were apt to hang in contact with each other, with the result that some of the kernels were not properly dried and became moldy. Then, when the corn was planted, a good deal of the corn would not germinate, or would produce inferior plants.

Therefore, the main objects of this invention are to provide a simple and inexpensive hanger for seed corn, in which the ears of corn are supported in uniform spaced relation with all of the kernels exposed for ventilation; to provide a hanger in which the separate ears are accessible for inspection and may be removed or re-adjusted without disturbing all of the remaining ears; and to provide a hanger which may be assembled in sections into the lengths desired, and in which the ears may be mounted in a simple, easy manner.

An illustrative embodiment of this invention is shown in the accompanying drawing, wherein:

Fig. 1 is an elevation showing several of the racks connected together.

Fig. 2 is an elevation on an enlarged scale of one of the racks.

Fig. 3 is a side elevation of Fig. 2, and also illustrates the manner in which the ears are mounted.

Fig. 4 shows a perspective view of the preferred form of certain details of construction.

Fig. 5 and Fig. 6 show additional modified forms.

Referring to the drawings, the sheet metal strip 1 is provided with a hook 2 at the upper end, so that the rack strips may be attached to such supports as the wire 3 in Fig. 1. The lower end of the rack 1 is provided with an aperture 4 so that several sections may be hooked together, as shown in Fig. 1. The edge of the strip 1 is provided with spaced notches 5 by making a transverse cut and a vertical cut at the inner end of the first cut, and bending the lugs 6 thus formed outwardly. Preferably a recess 7 is formed in the central portion of the strip at the bottom of the notch to prevent the spike 8 from slipping sidewise.

The spike 8 is driven into the pith in the base end of the ear of corn with a short portion of the head end of the spike protruding, as illustrated in Fig. 3. The ears are then mounted by inserting the heads of the spikes into the notches, starting from the bottom of the strip and working upwardly. The adjacent lugs 6 are bent oppositely so that the same number of ears are on the opposite sides of the strip for balancing. The shank of the spike rests in the recess 7 in the bottom of the notch, and the lug 6 engages near the head of the spike in offset relation with the lower support so that the ears are held in substantially horizontal positions.

Also, the notches may be formed by bending both the portions above and below the transverse cut in opposite directions, with a curved bend, as shown in Fig. 5, or with an angular bend, as shown in Fig. 6.

The device is extremely simple and inexpensive and supports the corn in orderly spaced relation. The support wires 3 may be strung in any suitable place, and the racks put together and hooked onto the wires. The rows of ears will extend laterally to the length of the wire so that a great number of ears may be hung in a restricted space. By making the racks in short sections, large packages are avoided in shipping and storing, but the racks may be conveniently assembled into such lengths as are suitable for the particular location.

Although but one specific embodiment of this invention has been herein shown and described, it will be understood that details of the construction shown may be altered or omitted without departing from the spirit of this invention as defined by the following claims.

I claim:

1. In a seed corn hanger, a rack comprising a strip of sheet metal having a hook on one end for attaching the rack to a suitable support, the rack having lugs bent outwardly to provide notches for receiving spikes forced into the ends of the ears of corn.

2. In a seed corn hanger, a rack comprising a strip of sheet metal having a hook on one end for attaching the rack to a suitable support, the strip of sheet metal having apertures spaced along the length for receiving spikes forced into the ends of the ears of corn and supporting the ears in spaced relation.

3. In a seed corn hanger, a rack for pendantly attaching to a suitable support, the rack having notches along the edge for receiving the ends of spikes forced into the ends of the ears of corn and holding the spikes with the ears in spaced positions substantially at right angles to the rack.

4. In a seed corn hanger, a pendant rack comprising a strip of sheet metal having notches cut in the edge with the metal above the notches bent outwardly to hold ear mounting spikes inserted in the notches in substantially horizontal position.

5. In a seed corn hanger, a pendant rack comprising a strip of sheet metal having notches cut in the edge with the metal above the notches bent outwardly to hold ear mounting spikes inserted in the notches in substantially horizontal position, and recesses formed in the lower edges of the notches to hold the spikes from slipping sidewise.

Signed at Morocco, Ind. this 8th day of July 1926.

PARMER D. WELLS.